United States Patent [19]
Tracy et al.

[11] Patent Number: 5,489,321
[45] Date of Patent: Feb. 6, 1996

[54] WELDING/SEALING GLASS-ENCLOSED SPACE IN A VACUUM

[75] Inventors: C. Edwin Tracy; David K. Benson, both of Golden, Colo.

[73] Assignee: Midwest Research Institute, Kansas City, Mo.

[21] Appl. No.: 274,788

[22] Filed: Jul. 14, 1994

[51] Int. Cl.⁶ ............................................. C03B 23/203
[52] U.S. Cl. ............................ 65/43; 65/152; 156/99; 156/272.2; 156/272.8
[58] Field of Search ................... 65/36, 40, 43, 65/152; 156/89, 99, 102, 104, 272.8, 290, 299, 272.2

[56] References Cited

U.S. PATENT DOCUMENTS

| | | | |
|---|---|---|---|
| 3,217,088 | 11/1962 | Steierman | 174/52 |
| 3,749,562 | 7/1973 | Nicolas et al. | 65/34 |
| 4,142,881 | 3/1979 | Louis | 65/40 |
| 4,508,514 | 4/1985 | English | 445/26 |
| 4,683,154 | 7/1987 | Benson et al. | 428/34 |
| 4,961,768 | 10/1990 | Djeu | 65/4.21 |
| 5,176,788 | 1/1993 | Kabacoff et al. | 156/603 |

FOREIGN PATENT DOCUMENTS

| | | | |
|---|---|---|---|
| 61-6015 | 2/1986 | Japan | 65/36 |

OTHER PUBLICATIONS

IBM Technical Disclosure Jul. 1972 Effecting a Hermetic Seal in a Glass System.

*Primary Examiner*—David L. Lacey
*Assistant Examiner*—Sean Vincent
*Attorney, Agent, or Firm*—Edna M. O'Connor

[57] ABSTRACT

A method of welding and sealing the edges of two juxtaposed glass sheets together to seal a vacuum space between the sheets comprises the steps of positioning a radiation absorbant material, such as FeO, $VO_2$, or NiO, between the radiation transmissive glass sheets adjacent the edges and then irradiating the absorbant material, preferably with a laser beam, through at least one of the glass sheets. Heat produced by the absorbed radiation in the absorbant material melts glass in the portions of both glass sheets that are adjacent the absorbant material, and the melted glass from both sheets flows together to create the weld when the melted glass cools and hardens. The absorbant material can be dissolved and diffused into the melted glass to the extent that it no longer absorbs enough energy to keep the glass melted, thus, with appropriate proportioning of absorbant material to source energy power and welding heat needed, the process can be made self-stopping.

14 Claims, 3 Drawing Sheets

5,489,321

WELDING/SEALING GLASS-ENCLOSED SPACE IN A VACUUM

CONTRACTUAL ORIGIN OF THE INVENTION

The United States Government has rights in this invention under Contract No. DE-AC36- 83CH10093 between the U.S. Department of Energy and the National Renewable Energy Laboratory, a Division of Midwest Research Institute.

BACKGROUND OF THE INVENTION

1. Field of the Invention

This invention is generally related to laser processing of materials and more specifically to an improved method of welding or sealing together the edges of juxtaposed, spaced apart glass sheets in a vacuum.

2. Description of the Prior Art

In our U.S. Pat. No. 4,683,154, which is incorporated herein by reference, we described a laser sealed vacuum insulation window. The window comprises two juxtaposed sheets of glass held spaced apart in relation to each other by a plurality of spherical glass beads, and the edges of the juxtaposed glass sheets are glass-welded together to provide a sealed, evacuated space between the juxtaposed glass sheets that is completely glass-sealed from the exterior. The edges of the juxtaposed glass sheets are welded together in a vacuum chamber by a laser beam that is focused and steered around the edges of the glass sheets. The laser used to melt and weld the edges together had to be of a wavelength that is absorbed by the glass and of sufficient power to raise the temperature of the glass edges to the melting temperature of the glass, which is about 1,200° C. to 1,300° C. for borosilicate glass.

Unfortunately, the laser welding of the edges of the juxtaposed glass sheets to seal the vacuum space has been hindered by several technical problems that occur when the glass is heated above its annealing temperature in the vacuum chamber. First, dissolved gases in the glass tend to nucleate bubbles in the weld line, which become defects that can produce flaws and failures of the vacuum tight seal. Second, the molten glass at the weld point vaporizes and contaminates the mirror in the vacuum chamber that is used to steer the laser beam around the edges of the glass sheets being welded, which decreases specularity of the mirror and diffuses the laser beam, thus causing a loss of power and frustrating the welding process, and, if allowed to continue, could result in excessive absorption of the laser beam and consequent heat damage to the mirror.

SUMMARY OF THE INVENTION

Accordingly, it is a general object of the present invention to improve the process of laser welding/sealing the edges of juxtaposed sheets of glass together in a vacuum.

It is a more specific object of the present invention to provide a method for laser welding sheets of glass together that reduces the tendency to form gas bubbles in the weld.

It is still another specific object of the present invention to provide a method of laser welding glass sheets together in a vacuum that minimizes vapor production at the weld point.

A further object of this invention is to provide a more efficient and controllable method of laser welding glass sheets together.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, the method of this invention may comprise the steps of positioning a strip of radiation absorbant material between the edges of two juxtaposed glass sheets that are transparent to the radiation, irradiating the strip of absorbant material through a glass sheet so that it absorbs sufficient energy to emanate enough heat to melt and flow together the portions of the glass sheets that are adjacent the absorbant material, and then allowing the melted glass to cool and solidify to form the welded seal. One embodiment also includes the step of dissolving and diffusing the absorbant material into the melted glass enough so that it does not absorb and emanate enough energy to keep the glass melted, thereby providing self-stopping of the welding.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings.

DETAILED DESCRIPTION OF THE PREFERRED EMBODIMENTS

Figure 1:
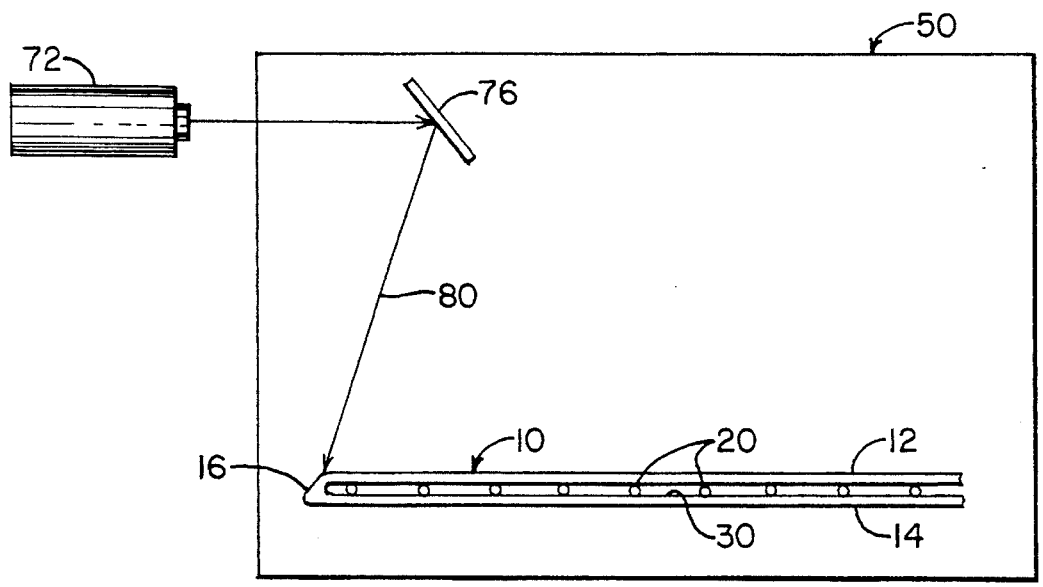
In FIG. 1 is a diagrammatic view of a prior art laser welding system for welding and sealing edges of juxtaposed glass sheets that can be used in the method of the present invention.

Insulated glass panels 10, as described in our U.S. Pat. No. 4,683,154, which is incorporated herein by reference, comprise, two sheets of glass 12, 14 in juxtaposed relation to each other with an evacuated space 30 between them. The glass sheets 12, 14 are held apart by glass spacer beads 20, and the edges are sealed vacuum tight by laser welding them. A system for making the laser weld 16 around the edges of the glass sheets 12, 14 to seal the vacuum in the space 30 is illustrated diagrammatically in FIG. 1. It comprises a thermal vacuum chamber 50 into which the assembly of the glass sheets 12, 14 and spacer beads 20 are positioned. The chamber 50 is evacuated to the vacuum desired in the space 30, such as $10^{-6}$ torr, and the glass sheets 12, 14 are heated to, or slightly above, their annealing temperature. Then, a laser beam 80 from a laser source 72 is steered by a mirror 76 to focus on the peripheral edge of the top glass sheet 12 to melt the edge of the top glass sheet 12 together with the edge of the bottom glass sheet 14 to produce a glass weld 16 all around the panel 10.

Figure 2:
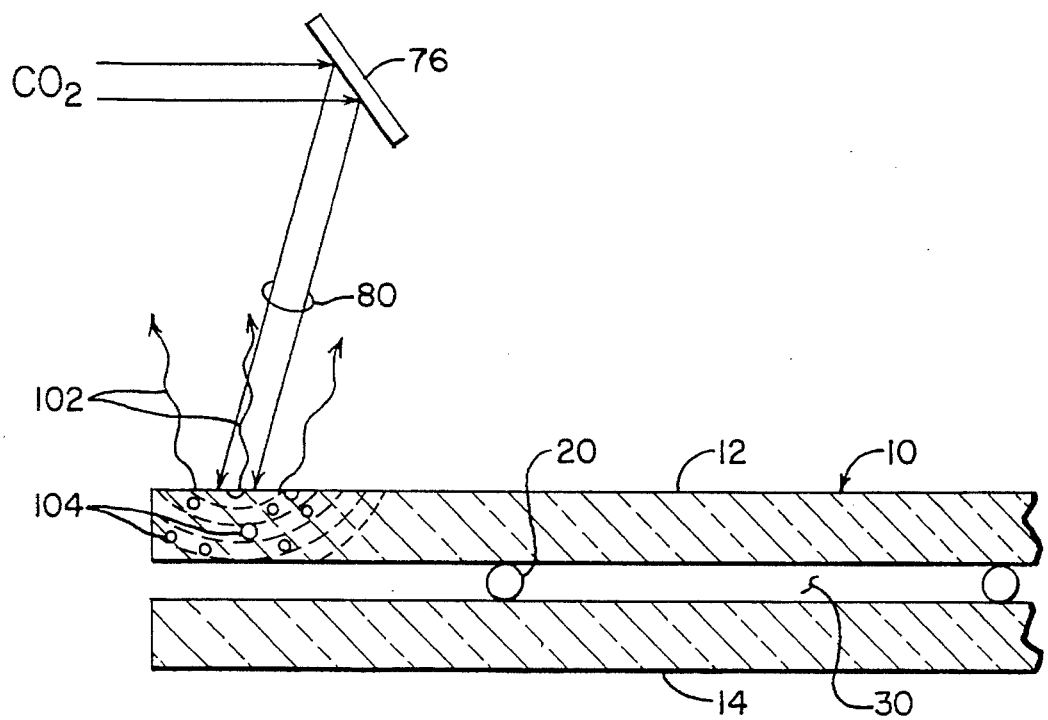
FIG. 2 is an enlarged diagrammatic view of a laser-welded edge seal according to the prior art process of which this invention is an improvement.
Figure 3:
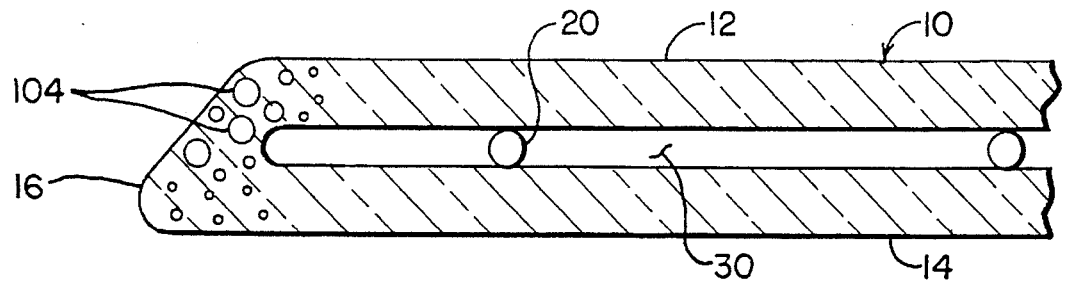
FIG. 3 is an enlarged diagrammatic view of a laser-welded edge seal according to the prior art process of which this invention is an improvement.

In our previous embodiment of U.S. Pat. No. 4,683,154, as illustrated in FIG. 2, the laser beam 80 is focused on the edge of the top glass sheet 12 to heat it to its melting temperature and to melt it together with the edge of the bottom glass sheet 14 to create the welded edge seal 16, as shown in FIG. 3. The laser beam 80 in the prior art embodiment, as best seen in FIG. 2, had to be radiation of a wavelength that is absorbed by glass, i.e., in the higher infrared range, and it had to be powerful enough to create sufficient heat to melt all the way through the top sheet 12 and into the bottom sheet 14. For example, a $CO_2$ laser with a wavelength of about 10.6 μm was suggested for that application. The process was difficult to control, because to get enough heat into the bottom glass sheet 14, the adjacent area of the top sheet had to be almost totally melted, thus puddling and sometimes running. Besides being an inefficient use and dissipation of heat, the heat vaporized some of the glass, as illustrated by the arrows 102 in FIG. 2, which vapor migrated to and deposited on the steering mirror 76 causing diffraction, scattering, and weakening of the laser beam 80, as well as producing a heat-absorbing surface on the mirror that would, if not checked, raise the temperature of the mirror to damaging levels. Also, glass is a supercooled liquid that has gas bubbles dissolved in it. The high temperatures and power of heat dissipation required to melt all the way through the top glass sheet 12 and into the bottom glass sheet 14 and the resulting large amount of melt pool created caused substantial amounts of the dissolved gases in the glass to be freed to make bubbles 104. The resulting weld 16, as shown in FIG. 3, had an excess of large bubbles 104 formed and then trapped. Such large, trapped bubbles 104 can weaken the integrity of the weld 16, and they often became points of stress concentration and caused fractures and failure of the weld 16 and consequent loss of vacuum from the space 30.

Figure 4:
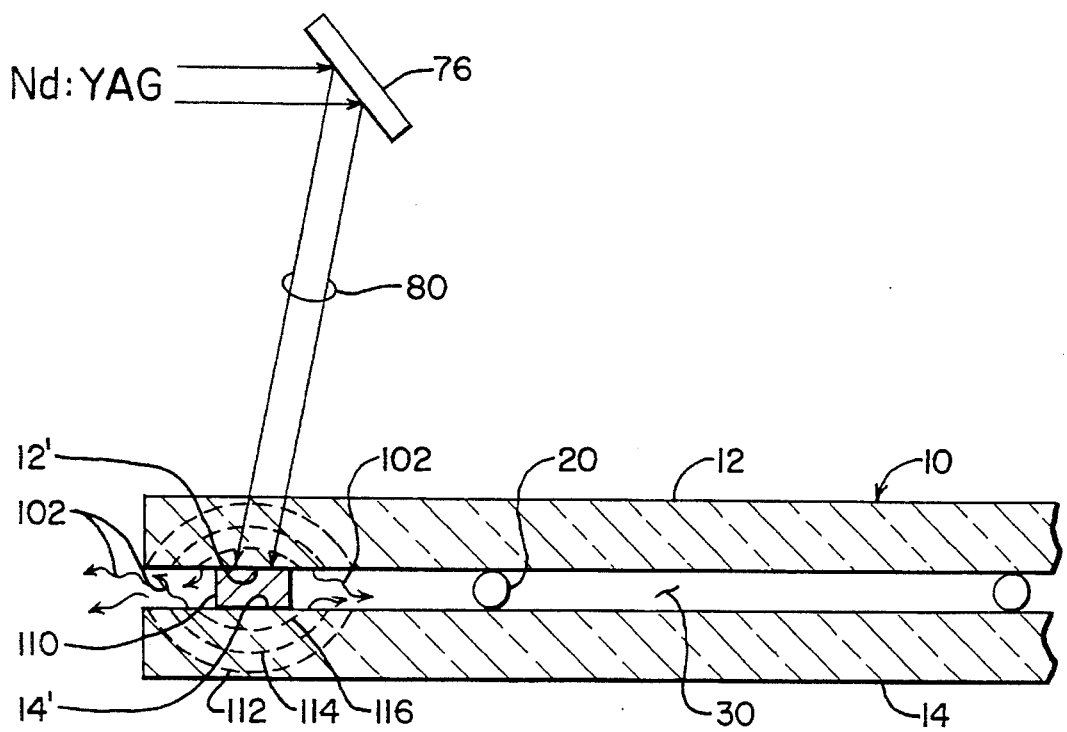
FIG. 4 is an enlarged diagrammatic view in cross-section of a glass panel illustrating the laser-welding method of the present invention.
Figure 5:
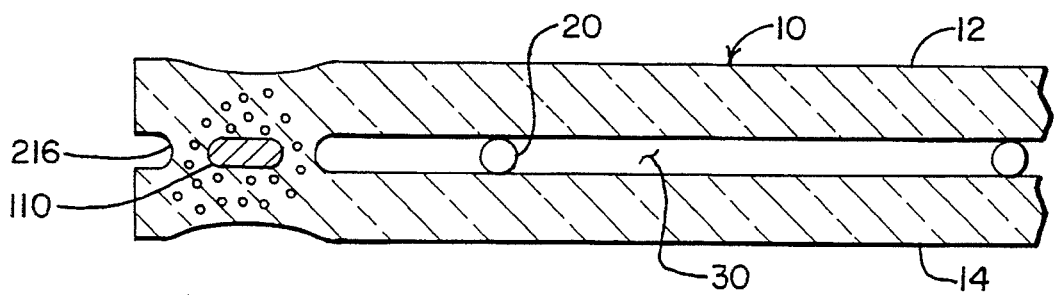
FIG. 5 is a diagrammatic view similar to FIG. 4, but illustrating the completed weld at the edge of the panel according to this invention.

The improvement of this invention is illustrated in FIGS. 4 and 5. A light absorbing material 110, such as a metal or an appropriate oxide, is positioned between the glass sheets 12, 14 adjacent the edges where the glass is to be welded. The light absorptive heating material 110 is preferably highly absorbant of light in wavelengths that are readily transmitted by the glass of sheets 12, 14. Therefore, as shown in FIG. 4, the laser beam 80 can pass unimpeded through the top glass sheet 12 to where it is then absorbed by the light absorbing and heating material 110. Upon being absorbed by the material 110, the laser beam energy is convened and dissipated substantially as heat, which is both conducted and radiated into the adjacent glass panels 12, 14 as indicated by the approximate isothermal lines 112, 114, 116 in FIG. 4. This heat is sufficient to melt the adjacent glass panels 12, 14 from their respective juxtaposed inside surfaces 12', 14', where the weld has to be made, instead of from the outside surface, as was described above and illustrated in FIG. 2. With the heat concentrated more where it is needed, the welding process is more efficient. Less heat is needed for less time to make the weld 216, which forms around the hot, light absorbing material 110, as shown in FIG. 5. Also, by using less and more concentrated heat for less time, formation of gas bubbles is more controlled and minimized, if not eliminated. Any gas bubbles 104 that might form are small and dispersed, as illustrated in FIG. 5, thus not as potentially harmful to the weld 216. It is preferable, although not always necessary, to heat the entire glass sheets 12, 14 to or slightly above their annealing temperature in a vacuum chamber during the edge welding process to avoid stress fractures while the vacuum space between the glass sheets is being sealed shut by the edge welds. The problem of contaminating or coating the mirror 76 is also reduced substantially by the improved method of this invention. Not only does the more confined and lower energy weld process produce less vapor, but the top glass sheet 12 actually functions as a vapor shield between the weld area and the mirror 76 to confine vapor 102, as shown in FIG. 4.

In the embodiment described above and shown in FIGS. 4 and 5, the glass can be, for example, good grade, borosilicate "technical glass", such as Corning 7056 (trademark) manufactured by Corning Glass, of Corning, N.Y., which is substantially transparent or transmissive to light wavelengths in the range of about 0.3 to 2.2 μm, and the laser can be, for example, a neodymium doped yttrium aluminum garnet (Nd:YAG), which emits light with wavelength of about 1.06 μm. However, there are many other glasses and lasers that can fit the transmissive criteria discussed above.

For example, the following glasses are also compatible with Nd:YAG lasers: 1720 aluminosilicate; 0080 soda-lime; 7570 lead silicate; and 7940 fused silica (all available from Corning Glass).

The light absorptive heating material 110, therefore, should be substantially absorptive of light in the wavelength range of the laser, and it should be a material that is compatible with the glass. For example, a heating material 110 that has a much different coefficient of expansion than the glass could cause stress fractures in the weld 216 in conditions of large or fast temperature changes.

The most compatible absorbant material 110 according to this invention is a material that is also soluble in the glass, so it forms a graded, low stress or non-stressed interface with the glass during the welding process. Iron oxide (FeO) is a particularly compatible absorbing material for this purpose, because it not only is soluble in glass, but its $Fe^{2+}$ ion has its maximum light absorption at a wavelength of about 1.1 μm, which substantially matches the 1.06 μm wavelength of the Nd:YAG laser. Vanadium ions ($V^{4+}$), which best absorb 1.12 μm wavelength light, and nickel ions ($Ni^{2+}$), which best absorb light in both the 1.19 μm and the 1.33 μm range, are also suitable substitutes. These substitutes and many others, such as graphite and Kovar, may be useful, depending on the particular glass transmissivity and laser wavelength combination being used. In fact, the solubility of FeO and other suitable compounds in glass, if used in appropriate proportion with the heat needed to create an effective weld, can yield the additional advantage of a self-regulating or self-stopping welding process. Specifically, as the hot FeO dissolves into the surrounding melted glass, it diffuses into an ever-widening area and eventually becomes too diluted to absorb enough of the laser beam 80 to keep the glass melted. If such depletion occurs as the weld 216 becomes sufficiently complete to seal the vacuum space 30 between the glass sheets 12, 14, the welding process at that location will be self-limiting so that over-melting or over-processing does not occur.

Figure 6:
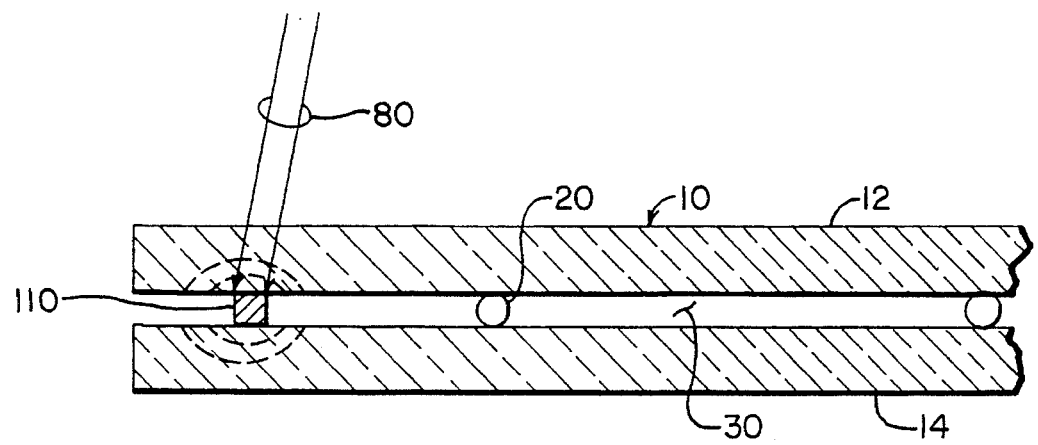
FIG. 6 is a diagrammatic view similar to FIG. 4, but illustrating an alternate embodiment, self-regulating method of laser welding according to this invention.

For example, as shown in FIG. 6, a smaller, properly-sized, strip or bead of light absorptive heating material 110, such as FeO, is shown, as before, sandwiched between the glass sheets 12, 14 adjacent their peripheral edges. The laser beam 80 with a wavelength that is transmitted by the glass, but absorbed by the material 110 is directed through the top glass sheet 12 to the heating material 110. The energy from the absorbed laser beam 80 emanates from the material 110 as heat into the glass sheets 12, 14, as described above, to melt the glass adjacent the heating material 110.

Figure 7:
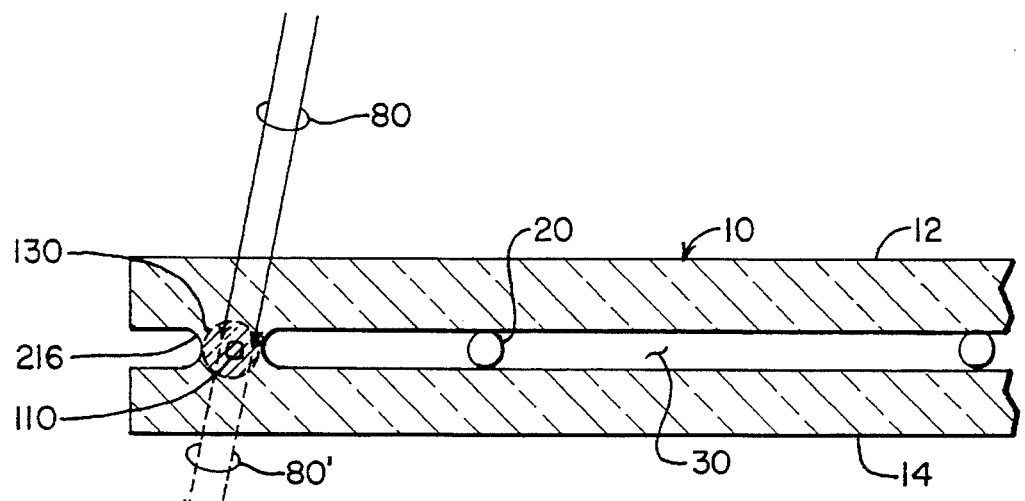
FIG. 7 is a diagrammatic view similar to FIG. 6, but illustrating an intermediate phase of the alternate embodiment welding process wherein the absorber material melts and begins to disperse into the melted glass substrate.

As the glass melts and flows around the heating material 110, as illustrated in FIG. 7, the heating material 110, dissolves and diffuses into the melted glass to create a zone 130 of concentrated absorbing ions, such as the $Fe^{2+}$ ions from the dissolved FeO. The concentrated ions and the remaining undissolved material 110 still absorb most of the laser beam 80, thus continue to produce enough heat to continue melting the surrounding glass as the weld 216 widens. However, as shown by the broken line rays 80' in FIG. 7, some of the laser beam 80 does pass through the zone 130 of concentrated ions.

Figure 8:
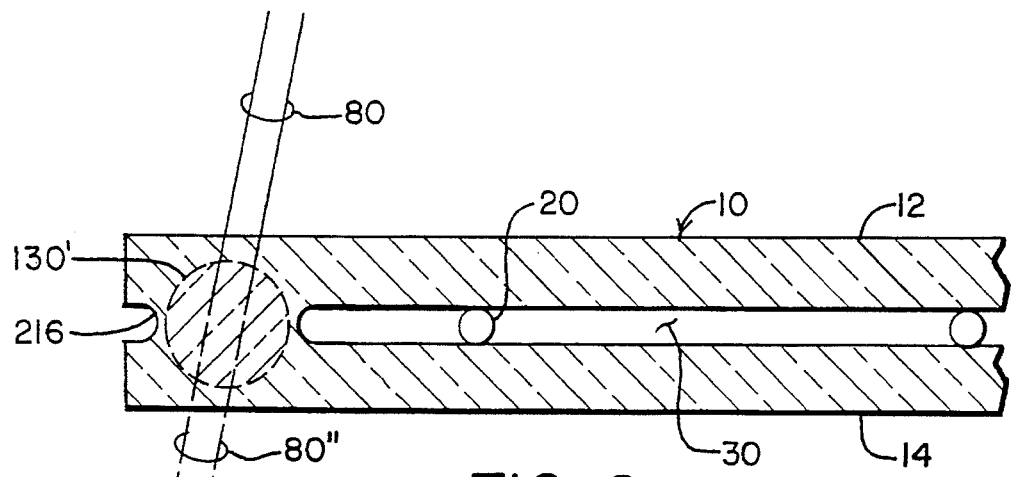
FIG. 8 is a view similar to FIG. 7, but illustrating the self-regulating feature of the alternate embodiment where the absorbent material is dispersed enough into the glass substrate such that the laser radiation passes through the glass, instead of being absorbed, to terminate the welding process.

As the welding progresses, the remaining heating material 110 becomes entirely dissolved into the surrounding glass. Then, as the dissolved ions diffuse into a widening zone 130', as shown in FIG. 8, they absorb less and less of the laser beam 80 as more and more of the laser beam 80 passes through the zone 130' and bottom glass sheet 14. Eventually, there is insufficient energy absorbed from the laser beam 80 to keep the glass melted, so it solidifies and self-ends or stops the welding process, even if the laser beam 80 is still incident on the zone 130'. Of course, by that time in a welding process, it is time for the laser beam to be moving away to an adjacent area (not shown) where the welding of the edges of sheets 12, 14 continues, but failure to do so will not result in over-processing or excessively melting the glass, and very uniform, reliable welds 216 can be obtained according to this invention. The resulting weld 216 remains substantially transparent, and the dissolved heating material 110 becomes substantially invisible except perhaps for some coloration imparted to the molten glass weld 216.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A method of welding together two juxtaposed sheets of glass that are transparent to certain radiation, comprising the steps of:

positioning a radiation absorbent and heat dissipating material between said sheets;

directing a beam of said radiation through at least one of said sheets to said material and allowing said material to absorb sufficient amounts of said radiation to produce and emanate sufficient heat to said glass sheets to melt portions of said glass sheets that are adjacent said material;

allowing the melted portions of said adjacent sheets to flow together and then to cool below melting point temperature and solidify to form a weld from the melted portion of said adjacent sheets.

2. The method of claim 1, including the step of dissolving said material into said melted glass.

3. The method of claim 2, including the step of allowing said dissolved material to diffuse into said melted glass to a sufficient extent that the material absorbs insufficient amounts of said radiation to produce enough heat to keep the glass melted.

4. The method of claim 1, wherein said material comprises an oxide.

5. The method of claim 4, wherein said oxide comprises iron oxide (FeO).

6. The method of claim 4, wherein said oxide comprises vanadium oxide ($VO_2$).

7. The method of claim 4, wherein said oxide comprises nickel oxide (NiO).

8. The method of claim 1, wherein said radiation has a wavelength in the range of 0.3 to 2.2 μm.

9. The method of claim 8, wherein said radiation is a laser beam.

10. The method of claim 9, wherein said laser beam is produced by a Nd:YAG laser.

11. The method of claim 3, wherein the material is positioned with respect to the radiation and the glass sheets so as to produce sufficient heat to result in a completed weld fastening said two sheets together with a vacuum-tight seal.

12. A method of welding together and hermetically sealing a space between peripheral edges of two juxtaposed sheets of glass which are substantially transparent to optical energy, comprising the steps of:

positioning a strip of optical energy absorbent and heat dissipating material between the peripheral edges of the respective juxtaposed sheets of glass; and irradiating said strip of material through at least one of said sheets of glass with enough of said optical energy to produce enough heat in said strip of material to heat, melt, and flow together portions of both of said sheets of glass that are adjacent said strip; and allowing said melted portions of said sheets of glass to cool, solidify and to hermetically seal to each other.

13. The method of claim 12, including the step of dissolving said strip of material with the melted glass.

14. The method of claim 13, including the step of allowing the dissolved strip of material to diffuse into the melted glass enough to lower absorption of the optical energy enough so that insufficient heat is produced by the remaining absorption to keep the glass melted.

* * * * *